United States Patent [19]

Holtzman et al.

[11] 4,442,473

[45] Apr. 10, 1984

[54] MULTI-SECTION POWER CAPACITOR WITH INTERNAL FUSING ARRANGEMENT

[75] Inventors: Barry L. Holtzman, Richland; George E. Mercier, Bloomington, both of Ind.

[73] Assignee: Westinghouse Electric Corp., Pittsburgh, Pa.

[21] Appl. No.: 397,754

[22] Filed: Jul. 13, 1982

[51] Int. Cl.³ .................. H01G 1/11; H01G 4/38
[52] U.S. Cl. ................................ 361/275; 361/328
[58] Field of Search ............ 29/25.42; 361/301, 271, 361/272, 275, 328, 331

[56] References Cited

U.S. PATENT DOCUMENTS

| | | | |
|---|---|---|---|
| 2,231,701 | 2/1941 | Brooks | 361/275 |
| 2,264,994 | 12/1941 | Marbury et al. | 361/328 X |
| 3,304,474 | 2/1967 | McClain | 361/275 |
| 4,193,106 | 3/1980 | Coleman | 361/275 X |

FOREIGN PATENT DOCUMENTS 308567  6/1933  Italy ..................................... 361/328

Primary Examiner—Donald A. Griffith
Attorney, Agent, or Firm—G. H. Telfer

[57] ABSTRACT

A power capacitor with a plurality of section windings stacked within a housing is provided with an interconnection and fusing arrangement in which insulative spacer elements extending from between adjacent sections support a common electrical bus and an insulative locater element. Fuse wires attached to ends of the section windings extend around an edge of the locater element to the bus and are maintained thereby in spaced relation to avoid interaction between neighboring fuses when one clears.

5 Claims, 5 Drawing Figures

MULTI-SECTION POWER CAPACITOR WITH INTERNAL FUSING ARRANGEMENT

BACKGROUND AND SUMMARY OF THE INVENTION

The present invention relates to power capacitors having a plurality of capacitive section windings within an enclosure with fusible elements between the section windings and the external terminals of the enclosure.

Reference is made to copending application Ser. No. 298,788, filed Aug. 18, 1981 by Thiel et al. and assigned to the present assignee which discloses power capacitors of a type with which the improvement of the present invention may be used.

Internal fusing in power capacitors is a known practice to retain usefulness of the capacitor unit even if some of the individual section windings in the capacitor fail. The sections of a power capacitor normally are interconnected in series and parallel groups of individual section windings. It is desirable that if one section of a parallel group shorts out, the entire parallel group is not thereby shorted. Having a fusible connection for each of the section windings permits one to fail and to be effectively removed from the cirucit so that the remaining ones of the parallel group can perform their intended function.

Capacitors with internal fusing normally contain many more windings, typically about 25 to about 50, as compared to units having only external fusing which typically contain about 12 to about 20 sections. Therefore the internally fused units require a substantial number of fusible elements, one for each winding, which are of relatively light flexible wire, of silver or copper or alloys thereof, of a chosen length such as up to about five inches, that is sufficient for them to provide their protective function.

The delicacy of the fuse wires and their large numbers require that there be a stable mounting arrangement for them with adequate separation between them so as to avoid interaction during clearing. In addition to avoiding direct contact between adjacent fuse wires, care should be taken so that when a fuse operates by clearing, that it does not result in any rupture of neighboring fuse wires.

The present invention provides a way to mount numerous fuse wires in a capacitor unit in a manner that is both inexpensive and simple to implement while providing assurance of maintaining adequate spacing between the fuse wires. At the upper end of the stacked sections in the enclosure there is provided a means for insulatively supporting a common electrical bus that conducts from a number of paralleled sections to an external terminal. This insulative supporting means is provided by a plurality of insulative spacer elements disposed between certain adjacent ones of the sections and having an extended portion beyond the ends of the sections. The spacer elements support near their upper extremity, such as in an aperture therein, the common electrical bus that extends over the sections. The fuse wires are individually attached to their respective section windings, such as by soldering to the conductive material disposed on the ends of the windings in an extended foil capacitor, and extend to the common bus arouond an insulative locater member which may be a board-like element extending over the sections through slots in the insulative spacers that support the bus. In extending around the locator element, the fuse wires are held in a secure location against the edge of the locater. The support and location provided by the insulative board, to which the wires need not be fastened, provides adequate spacing of the fuse wires between each other. Consequently, the expense and difficulty of prior schemes for internal fusing are substantially avoided and the present invention provides a mounting and interconnection arrangement that can be readily used with various types of power capacitors including those of the extended foil type.

DESCRIPTION OF THE PREFERRED EMBODIMENTS

Figure 1:
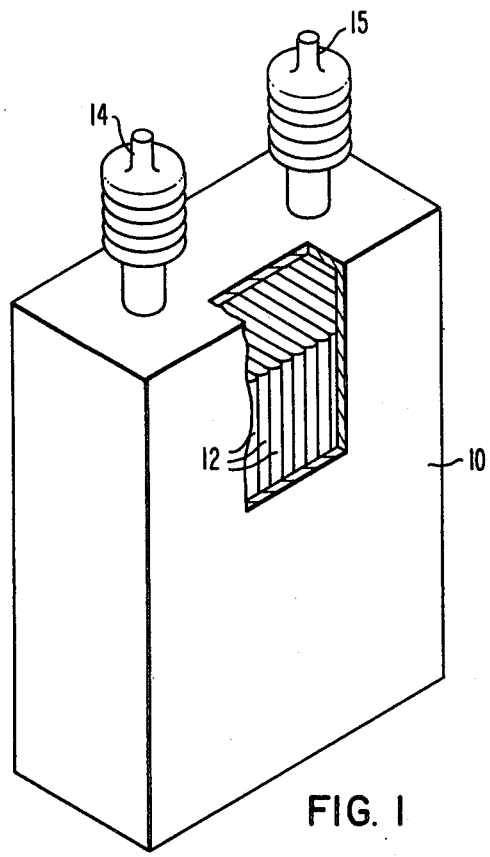
FIG. 1 is a perspective view of a capacitor unit which may be improved in accordance with the present invention.

FIG. 1 shows a capacitor unit having a unitary housing 10 that encloses a plurality of wound capacitor sections 12 that are stacked in the housing. Each of the capacitor sections 12 comprises electrode material such as aluminum foil and dielectric material such as polypropylene wound with dielectric material on each side of the two electrodes in a convolute winding. The unit is preferably impregnated with a liquid dielectric fluid. Terminals 14 and 15 extend through housing 10 for external connection of the capacitor unit. The plurality of capacitor sections 12 are mutually interconnected, within the enclosure 10, by means not shown in FIG. 1 but will be described in connection with subsequent Figures. The manner and means of connecting the interconnected sections to the terminals 14 and 15 extending from the housing are aspects of the capacitor unit with which the present invention is particularly concerned.

Figure 2:
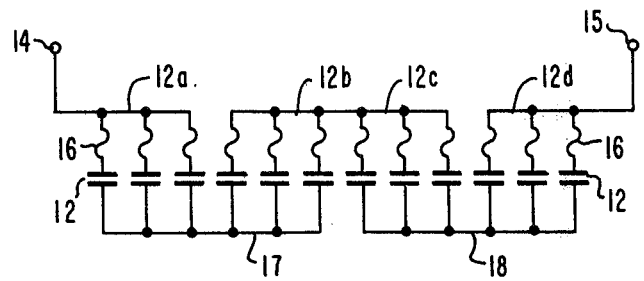
FIG. 2 is a circuit schematic showing an arrangement of capacitor sections and fuses which may be assembled in accordance with the present invention.

Referring to FIG. 2 there is shown a circuit schematic generally illustrating an example of how capacitor sections 12 may be interconnected with fuses 16 within a unit. While an actual unit may contain numerous additional sections than those illustrated, they would be similarly interconnected in a series of a plurality of groups 12a, 12b, 12c, and 12d in each of which the capacitor sections 12 are connected in parallel. Furthermore, each of the capacitor sections 12 has a fuse element 16 in series with one of its electrodes. The combination of groups 12a, 12b, 12c and 12d are connected to the external terminals 14 and 15 as shown.

For purposes of this description, the elements of FIG. 2 are oriented in the manner in which they would be physically located in the unit of FIG. 1 with each fuse 16 at the upper end of its respective section 12. The section interconnections 17 and 18 at the lower ends of the sections 12 may be formed in accordance with abovementioned copending application Ser. No. 293,788 utilizing what is generally known in the art as the extended foil technique. The following description will primarily concern the interconnection of the sections 12 and fuses 16 at the upper ends of the sections, also employing the extended foil technique. In general, the present invention is advantageously applied to extended foil units as described in the copending application but is not necessarily limited thereto.

Extended foil units are characterized by having the two electrode foils in each section offset from each other and from the solid dielectric material. In the assembled stack of sections, one electrode of each section extends from the upper end and the other electrode of each section extends from the lower end. Deposited metal, such as a solder mat, is applied to the section ends to form a connection point. Where direct connection of ends of adjacent sections is desired, a single continuous solder mat is applied over the sections to be so connected. In those instances where the adjacent section ends are not to be connected, a gap is left in the applied solder mat. The isolation of adjacent section ends is facilitated by having an insulating separator between each two sections that are to be independently connected. Such a separator extends outward from the section ends sufficiently to avoid contact between metal areas on the adjacent sections.

Figure 3:
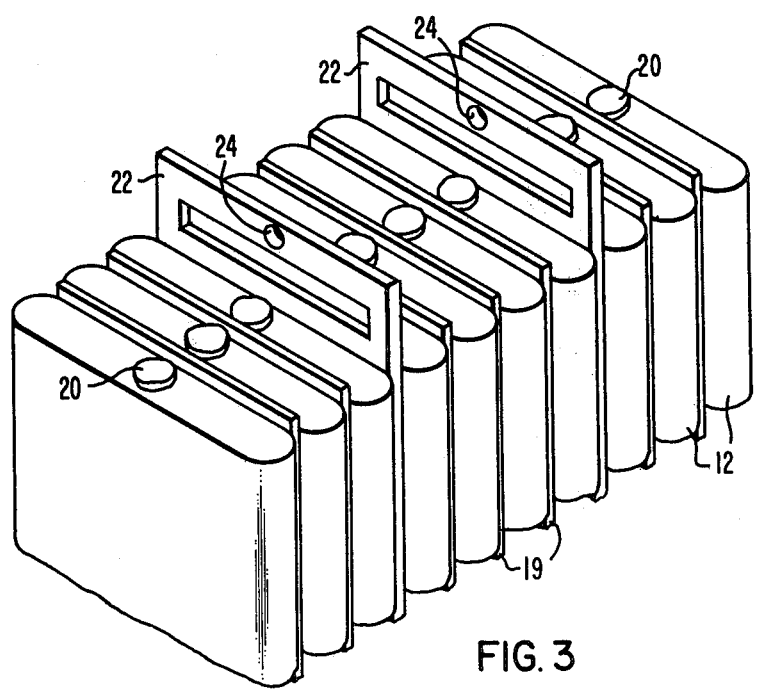
FIG. 3 is a further view of an embodiment of the present invention in partial assembly.

In FIG. 3 part of the connection support and arrangement means at the upper end of the sections 12 is shown. It comprises a plurality of insulative separator elements 19 located between adjacent sections for maintaining separate connection areas of deposited metal 20 as described above. For purposes of this invention, a separate connection area 20 is required for each individual section 12 that is to have its own fuse 16.

In addition to the separator elements 19, a plurality of insulating support members 22 (which may sometimes be referred to as spacers) are disposed between some of the sections 12. Normally these spacer elements 22 would be required between less than all of the adjacent sections, such as about every fourth section in the stack. The spacer elements 22 have sufficient rigidity to extend out from the ends of the capacitor sections 12 by a distance greater than the separators 19 or metal area 20 (see FIG. 5). Each spacer 22 is shown in this embodiment to have an aperture 24 extending through its upper extremity and also has a slot 26.

Figure 4:
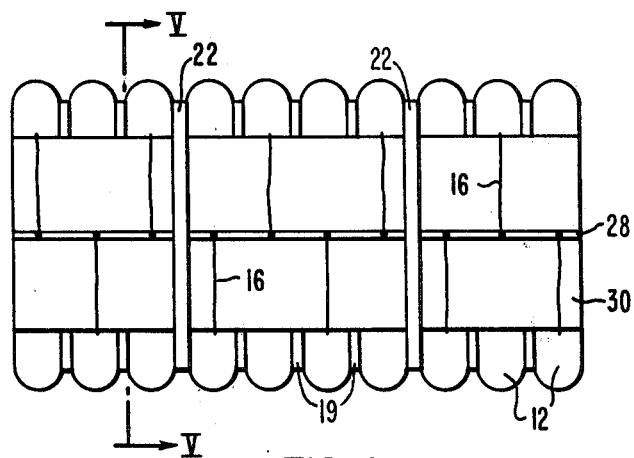
FIG. 4 is a plan view of an embodiment of the present invention.
Figure 5:
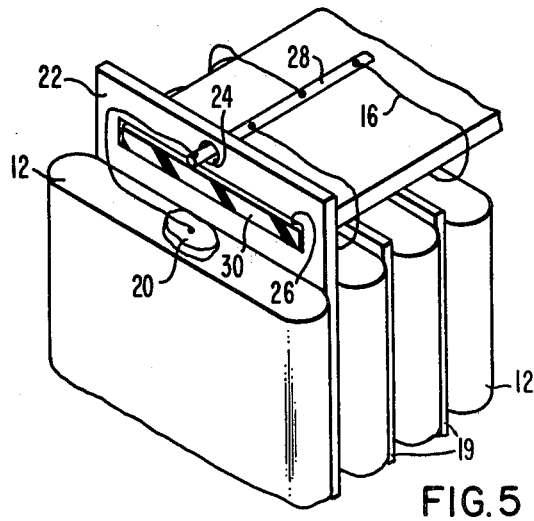
FIG. 5 is a perspective view of part of an embodiment of the invention taken along the line V—V of FIG. 4.

Referring to FIG. 3 together with the views of the more complete structures shown in FIGS. 4 and 5, it is seen the apertures 24 are aligned and have running through them a conductor 28 that serves as a common bus conductor for a number of parallel sections 12, of which ten are shown in FIGS. 3 and 4. Conductor 28 is to be connected to one of the housing terminals 14 or 15 or may be a connection of sections such as those shown in groups 12b and 12c of FIG. 2.

The slots 26 in spacers 22 accommodate and support an insulative board member 30 that lies over the sections 12. The insulative board serves as a locater for the fuse wires 16. As seen, each of the fuse wires 16 connects with one of the sections 12 at a connection area 20, approximately centrally located on the end of the section and extends or is wrapped around an edge of the locater 30 member to be bonded to the common bus 28 which is also approximately centrally located.

The arrangement accomplishes what is intended because the common bus 28 is fixed in place at a location where it can be connected to by the numerous fuse wires 16 in a reliably secure manner. The fuse wires 16 have their length determined by the distance between the connection 20 to the sections and the width of the insulative board so that several inches of fuse wire can be provided and still avoid contact among the wires.

An advantage of the present method of mounting and arranging internal fuses is that it may be practiced without any alteration of the manner of forming the section windings as may be influenced by other design considerations. For example, the arrangement of above-mentioned copending application Ser. No. 293,788 may be applied directly in the practice of this invention using the extended foil technique and solder mats on the ends of the sections for attachment of the fuse wires.

As shown in the illustrated embodiment, the electrical bus 28 extends through an aperture 28 in the insulating spacers. However, other means for locating the bus may be employed such as a notch or other configuration in the insulating spacers 22. The board 30 serving as the locater for the fuse wires normally needs to have no special configuration; a simple rectangular element as shown is sufficient. However, if desired in order to further stabilize the fuse wires, the locater board may have notches in its edges for those wires.

Furthermore, secure spacing between the fuse wires 16 is obtained by wrapping those from adjacent sections on alternate sides of the locater board 30 while each of the fuse wires can be of the same length as shown in FIG. 4. This is a reason for showing in the illustrated embodiment the location of the terminal bus 28 centrally above the sections and having the connection areas 20 on the sections also centrally located.

Tests have confirmed the operability of the invention. These have included tests producing intentional fuse operation in which it was shown that proper clearing occurred without disturbance of neighboring sections.

In the illustrated embodiment, the section windings 12 are stacked on end in the housing 10 with the connections and fusing arrangement above the sections. Units incorporating the present invention can also be made with the section windings stacked in the housing on their sides and the fusing arrangement located between them and a side wall of the housing. This latter arrangement has the advantage of permitting a greater number of section windings to be provided within the enclosure where the particular capacitor housing used is taller than it is wide.

While the present invention has been shown and described in a few forms only, it will be apparent that it may be practiced in various other specific forms without departing from the general teaching of the invention.

We claim:
1. A power capacitor comprising:
a plurality of wound capacitor sections in an enclosure having first and second terminals extending through said enclosure;
each of said capacitor sections comprising first and second electrodes and one or more sheets of dielectric material between said electrodes on both sides of said respective electrodes, said plurality of wound capacitor sections being assembled in a stack within said enclosure with ends of said sections being substantially aligned;
connection means for selectively connecting said sections into electrically parallel groups of sections and for selectively connecting said electrically parallel groups of sections in series with said terminals, said connection means comprising fusing means for opening the connection of an individual one of said sections upon a dielectric breakdown within said individual section;

said fusing means comprising a plurality of fuse wires each having one end connected to one end of one of said sections of one of said electrically parallel groups of sections and having a second end connected to a common electrical bus extending over said group of sections;

means for insulatively supporting said common electrical bus in spaced relation to said group of sections comprising a plurality of insulative spacer elements disposed between certain adjacent ones of said sections and having an extended portion beyond said ends of said sections; and, means for insulatively locating said plurality of fuse wires comprising an insulative locater member supported by said insulative spacer elements that support said bus with each of said fuse wires extending from a point on one of said sections around said locater member to said bus.

2. A power capacitor in accordance with claim 1 wherein: said bus is located within an aperture proximate the upper extremity of said spacer elements; and, said locater member is a board extending through slots in said spacer element extended portions.

3. A power capacitor in accordance with claim 2 wherein:

said fuse wires are connected to said section ends at the approximate center thereof and said bus extends over the approximate center of said section ends.

4. A power capacitor in accordance with claim 3 wherein:

individual ones of said plurality of fuse wires extend around on lateral edge of said locator element while other ones of said fuse wires extend around an opposite lateral edge of said locater element.

5. A power capacitor in accordance with claim 1 wherein: said capacitor sections have said electrodes extending from opposite ends thereof and said connection means comprises areas of deposited metal on end surfaces of said stack of sections; said fuse wires being selectively connected at said one end to said areas of deposited metal.

* * * * *